United States Patent [19]

Milco et al.

[11] Patent Number: 5,731,095

[45] Date of Patent: Mar. 24, 1998

[54] DENDRITIC POLYMER COATINGS

[75] Inventors: Larry A. Milco; Donald A. Tomalia, both of Midland, Mich.

[73] Assignee: Oxazogen, Inc., Midland, Mich.

[21] Appl. No.: 735,883

[22] Filed: Oct. 23, 1996

[51] Int. Cl.$^6$ .............................. B32B 27/06; C08F 2/32; C08F 20/00

[52] U.S. Cl. .................. 428/482; 528/288; 528/290; 528/299; 528/401; 525/437; 525/440; 525/540; 524/801; 524/802; 524/805; 524/839

[58] Field of Search ...................... 528/288, 290, 528/299, 401; 525/437, 440, 540; 524/801, 802, 805, 839; 428/482

[56] References Cited

U.S. PATENT DOCUMENTS

| | | | |
|---|---|---|---|
| 4,460,029 | 7/1984 | Schuetz et al. | 152/359 |
| 4,474,923 | 10/1984 | Keskey et al. | 524/458 |
| 4,587,329 | 5/1986 | Tomalia et al. | 528/363 |
| 5,418,301 | 5/1995 | Hult et al. | 525/437 |

*Primary Examiner*—Samuel A. Acquah
*Attorney, Agent, or Firm*—Price,Heneveld,Cooper,Dewitt & Litton

[57] ABSTRACT

A water-soluble or water-dispersible fluorine-containing dendritic polymer surfactant having at least one terminal fluorocarbon moiety and at least one terminal anionic moiety, and which is suitable for use in preparing protective coating compositions is disclosed. The water-soluble or water-dispersible fluorine-containing dendritic polymer surfactants are represented by the general formula:

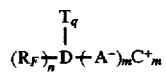

where D represents a dendritic polymer, $R_F$ represents a fluorocarbon containing moiety, $A^-$ represents an anionic containing moiety, $C^+$ represents a cation, T represents a terminal group of the dendritic polymer which has not been functionalized with a fluorocarbon or anionic moiety, n and m are at least each at least one, and the sum of n+m+q is the total number of terminal groups on the dendritic polymer. Also disclosed is a coating composition capable of forming a highly crosslinked, non-stick, protective coating. The coating composition includes a water-soluble or water-dispersible fluorine-containing dendritic polymer surfactant having at least one terminal fluorocarbon moiety and at least one terminal anionic moiety, an oxazoline crosslinking agent, and a water-based solvent.

41 Claims, 1 Drawing Sheet

Major Macromolecular Architectures

| I<br>*Linear* | II<br>*Cross-Linked* | III<br>*Branched* | IV<br>*Dendritic* |
|---|---|---|---|
| Flexible Coil<br>Rigid Rod<br>Cyclic (Closed Linear)<br>Polyrotaxane | Lightly Cross-Linked<br>Densely Cross-Linked<br>Interpenetrating Networks | Random Short Branches<br>Random Long Branches<br>Regular Comb-Branched<br>Regular Star-Branched | (a) Random Hyperbranched<br>(b) Controlled Hyperbranched (Comb-Burst™)<br>(c) Regular Dendrons Dendrimers (Starburst) |
| 1930's -<br>(H. STAUDINGER) | 1940's -<br>(P. FLORY & W. STOCKMAYER) | 1960's -<br>(L. FETTERS & J. ROOVERS) | 1980's -<br>(KIM & WEBSTER, ET AL.)<br>(TOMALIA, ET AL. & GAUTHIER, ET AL.)<br>(TOMALIA, ET AL. & FRECHET, ET AL.) |

FIG. 1

DENDRITIC POLYMER COATINGS

The U.S. Government has a paid-up license in this invention and the right in limited circumstances to require the patent owner to license others on reasonable terms as provided for by the terms of Contract No. DAAH04-96-C-0024 awarded by Department Of The Army.

FIELD OF THE INVENTION

This invention relates to water-based non-stick coating compositions derived from water-soluble or water-dispersible dendritic polymer surfactants containing pendant fluorocarbon groups and pendant chemically reactive anionic moieties. Such surfactants can be thermally crosslinked at low temperatures with an oxazoline crosslinking agent to form low-energy coatings which exhibit excellent anti-stick properties.

BACKGROUND OF THE INVENTION

There is a considerable demand for thin film coatings to which other substances will not adhere. Coatings are required to protect surfaces from soils, stains, ice, graffiti, insects, oils, corrosion, and chemical and biological contaminants. Moreover, as legislative pressures to remove volatile organic compounds (VOCs) from coating formulations persist, the demand for alternative water-borne systems continues to increase.

Compounds and polymer coatings containing fluorocarbon groups have been widely used for providing non-stick properties to surfaces. The foremost commercially available non-stick coating is polytetrafluoroethylene (PTFE). PTFE is characterized by a low surface free energy, excellent thermal stability, low coefficient of friction, anti-wetting properties, electrical insulation properties, and chemical inertness. However, because of its insolubility in most solvents, PTFE is relatively difficult to apply and is not very easily processed. Notably, conventional thermoplastic techniques are not applicable to PTFE. Rather, the material is most commonly applied by high temperature sintering processes (up to 400° C.). Also, PTFE exhibits poor adhesion to many substrates and is susceptible to wear and soiling. PTFE forms coating surfaces having microscopic pores into which various adhesives and foulant materials can permeate and become mechanically locked. As a result, PTFE does not form an effective non-stick surface against many types of materials, including adhesive marine materials and other biological foulants.

Recently, non-stick coatings have been prepared by crosslinking linear perfluoroalkyl polymeric surfactants containing pendant ionic moieties such as carboxylate with poly(2-isopropenyl-2-oxazoline). These coatings have the advantage of being soluble in predominately aqueous solvents. The thermally cured coatings provide non-wettable, hard polymer surfaces which are only slowly attacked by common organic solvents. However, prolonged cure times (several hours) are required to achieve highly crosslinked (e.g., 80%) coatings with optimum physical/chemical properties. Moreover, the excessive cure times associated with these coatings preclude widespread commercial utility.

Consequently, it would be desirable to provide low VOC non-stick coating formulations which cure rapidly at low temperatures to afford highly crosslinked non-stick coatings possessing excellent release properties.

SUMMARY

The present invention pertains to a water-soluble or water-dispersible fluorine-containing dendritic polymer surfactant having at least one pendant fluorocarbon moiety and at least one pendant anionic moiety.

This invention also pertains to coating compositions comprising an aqueous solvent, a water-soluble or water-dispersible fluorine-containing dendritic polymer surfactant having at least one pendant fluorocarbon moiety and at least one pendant anionic moiety, and a water-soluble or water-dispersible crosslinking agent having a plurality of oxazoline moieties which are capable of reacting with the anionic moiety of the dendritic polymer surfactant to form a crosslinked polymeric coating.

The non-stick coating compositions of this invention can be easily applied, such as with a brush, roller, spray gun, etc., and rapidly cured at a low temperature. Further, because the fluorine-containing dendritic polymer surfactants and coating compositions of this invention are water-soluble or water-dispersible, they can be formulated with low amounts of volatile organic solvents, whereby ease of application and rapid curing to form a hard, very low-porosity, non-stick coating is achieved while minimizing environmental and health hazards.

DESCRIPTION OF THE PREFERRED EMBODIMENTS

Figure 1:
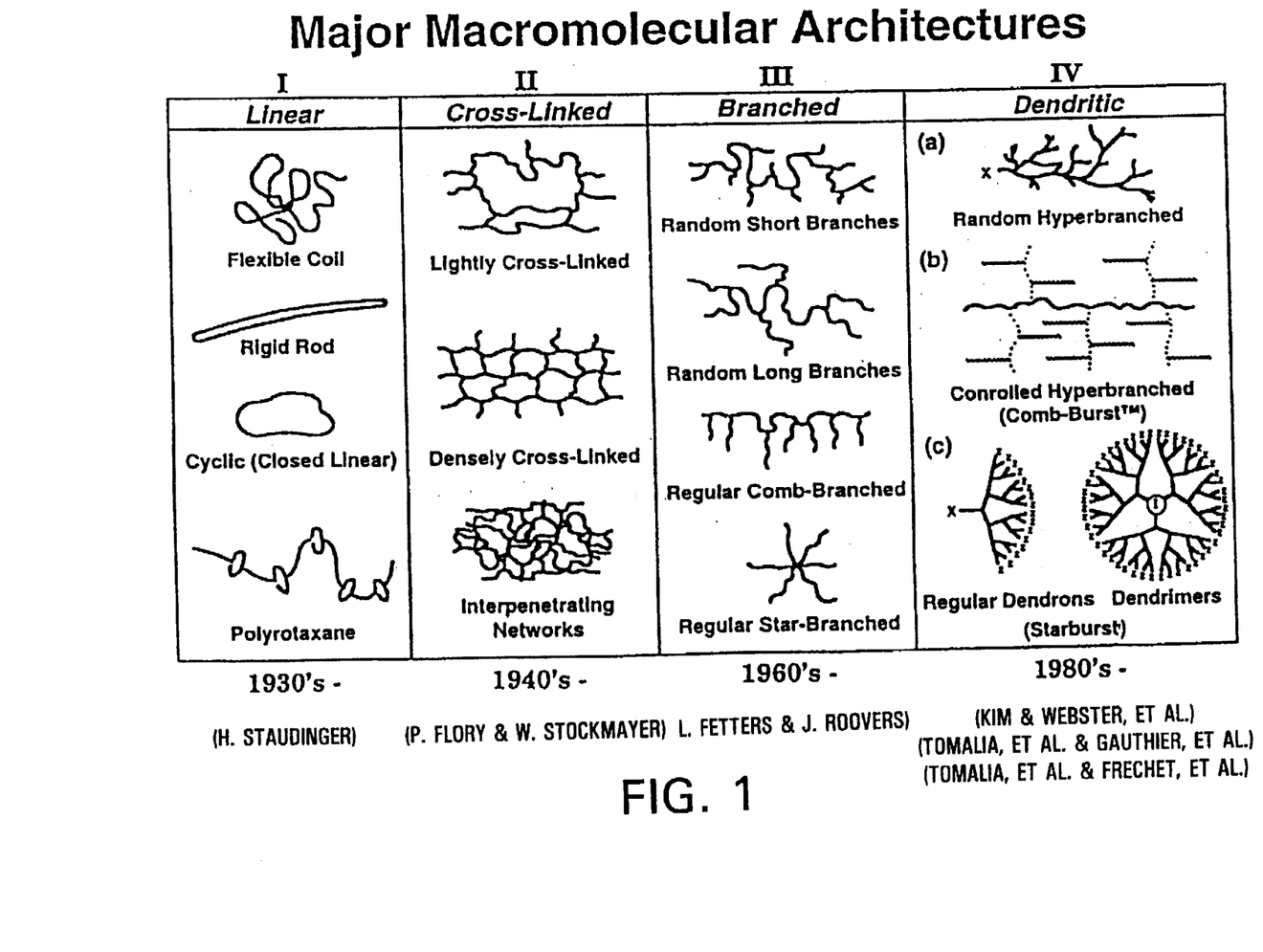
FIG. 1 is a schematic illustration of the major macromolecular architectures.

The dendritic polymers which may be used in the practice of this invention include generally any of the known dendritic architectures including dendrimers, regular dendrons, controlled hyperbranched polymers, dendrigrafts, and random hyperbranched polymers. Dendritic polymers are polymers with densely branched structures having a large number of reactive groups. A dendritic polymer includes several layers or generations of repeating units which all contain one or more branch points. Dendritic polymers, including dendrimers and hyperbranched polymers, are prepared by condensation reactions of monomeric units having at least two different types of reactive groups. This fourth major class of polymer architecture is shown in FIG. 1.

Dendrimers are comprised of a plurality of dendrons that emanate from a common core which can be a single atom or a group of atoms. Each dendron generally consists of terminal surface groups, interior branch junctures having branching functionalities greater than or equal to two, and divalent connectors that covalently connect neighboring branching junctures. Dendrons and dendrimers can be prepared by convergent or divergent synthesis. Divergent synthesis of dendrons and dendrimers involves a molecular growth process which occurs through a consecutive series of geometrically progressive step-wise additions of branches upon branches in a radially outward molecular direction to produce an ordered arrangement of layered branch cells, in which each macromolecular includes a core cell, one or more layers of internal cells, and an outer layer of surface cells, wherein each of the cells includes a single branch juncture. The cells can be the same or different in chemical structure and branching functionality. The surface branch cells may contain either chemically reactive or passive functional groups. Chemically reactive surface groups can be used for further extension of dendritic growth or for modification of dendritic molecular surfaces. The chemically passive groups may be used to physically modify dendritic surfaces, such as to adjust the ratio of hydrophobic to hydrophilic terminals. Convergent synthesis of dendrimers and dendrons involves a growth process which begins from what will become the surface of the dendron or dendrimer and progresses radially in a molecular direction toward a focal point or cove.

Dendrons and dendrimers may be ideal or non-ideal, i.e., imperfect or defective. Imperfections are normally a consequence of either incomplete chemical reactions, or unavoidable competing side reactions. In practice, real dendritic polymers are generally non-ideal, i.e., contain certain amounts of structural imperfections.

A third method by which dendrimers and dendrons can be prepared is by using a one-pot synthesis in which dendritic polymers are prepared by a step-growth polymerization reaction of a single type of monomer having a single reactive group of a first type (B) and a plurality (y) of reactive groups of a second type (A), i.e., a B-Ay type monomer, which is initiated by a core having a plurality (x) of the A type reactive groups, wherein A groups can react with B groups, but not with other A groups, and B groups cannot react with other B groups. The one-pot synthesis method is simpler and less expensive than the divergent and convergent synthesis methods. However, the one-pot synthesis method lacks reaction control, which leads to more polydispersed products with larger deviations from ideal dendron structure.

Hyperbranched polymers represent a class of dendritic polymers which contain high levels of non-ideal irregular branching arrays as compared with the more nearly perfect regular structure of dendrons and dendrimers. Specifically, hyperbranched polymers contain a relatively high number of irregular branching arrays in which not every repeat unit contains a branch juncture. Consequently, hyperbranched polymers may be viewed as intermediate between randomly branched polymers and regular dendrons and dendrimers, yet dendritic, because of their relatively high branch-juncture content per individual macromolecule.

The preparation and characterization of dendrimers, dendrons, random hyperbranched polymers, controlled hyperbranched polymers, and dendrigrafts is well known. Examples of dendrimers and dendrons, and methods of synthesizing the same are set forth in U.S. Pat. Nos. 4,507,466; 4,558,120; 4,568,737; 4,587,329; 4,631,337; 4,694,064; 4,713,975; 4,737,550; 4,871,779 and 4,857,599. Examples of hyperbranched polymers and methods of preparing the same are set forth, for example, in U.S. Pat. No. 5,418,301.

More generally dendritic polymers or macromolecules are characterized by a relatively high degree of branching (DB), which is defined as the number average fraction of branching groups per molecule, i.e., the ratio of terminal groups plus branch groups to the total number of terminal groups, branch groups and linear groups. For ideal dendrons and dendrimers the degree of branching is one. For linear polymers the degree of branching is zero. Hyperbranched polymers have a degree of branching which is intermediate between that of linear polymers and ideal dendrimers. The dendritic polymers used in this invention desirably have a degree of branching which is at least equal to or greater than 0.1, more preferably greater than or equal to 0.4, and most preferably greater than 0.5.

Dendritic polymers suitable for use with the invention also include macromolecules commonly referred to as cascade molecules, arborols, arborescent grafted molecules, and the like. Suitable dendritic polymers also include bridged dendritic polymers (i.e., dendritic macromolecules linked together either through surface functional groups or through a linking molecule connecting surface functional groups together) and dendritic polymer aggregates. The dendritic polymer used in the practice of this invention can be generationally monodisperse or generationally polydisperse solutions. Dendritic polymers in a monodisperse solution are substantially all of the same generation, and hence of uniform size and shape. The dendritic polymers in the polydisperse solution comprise a distribution of different generation polymers. Furthermore, the dendritic polymer molecules may be mixtures of different interior and exterior composition or functionality.

Generally, any of the known dendritic polymers having anionic terminal groups, or having terminal groups which can be reacted with another compound to provide anionic terminal groups, are suitable for use in preparing the water-soluble or water-dispersible fluorine-containing dendritic polymer surfactants and coating compositions of this invention. Examples of suitable dendritic polymers include poly (ether) dendrons, dendrimers and hyperbranched polymers, poly(ester) dendrons, dendrimers and hyperbranched polymers, poly(thioether) dendrons, dendrimers and hyperbranched polymers, poly(arylalkylene) dendritic polymers, etc.

While generally any dendritic polymer can be used in the preparation of the water-soluble or water-dispersible fluorine-containing dendritic polymer surfactants of this invention, it is desirable to avoid the use of dendritic polymers which are at least as basic as the oxazoline moieties of the crosslinking agent in the coating compositions of this invention because they tend to inhibit proton transfer to the oxazoline functional moieties and consequently inhibit crosslinking. Examples of dendritic polymers which tend to inhibit protonation of the oxazoline moieties include generally any of the amine containing dendrimers, such as the polyamidoamine (PAMAM) dendritic polymers.

The terminal or surface reactive groups of the dendritic polymers which are used to prepare the water-soluble or water-dispersible fluorine-containing dendritic polymer surfactants used in the preparation of non-stick coatings in accordance with this invention include any nucleophilic or electrophilic group which is capable of forming covalent bonds with a fluorine-containing compound and an anionic moiety-containing compound to afford a dendritic polymer surfactant.

The water-soluble or water-dispersible fluorine-containing dendritic polymer surfactants suitable for preparing the non-stick coatings of this invention are represented by the general formula where D represents a dendritic polymer, $R_F$ represents a fluorocarbon-containing moiety, $A^-$ represents an anionic containing moiety, $C^+$ represents a cation, T represents a terminal group which has not been functionalized with a fluorocarbon or anionic moiety, n and m are each at least one, and the sum of n+m+q is the total number of terminal groups on the dendritic polymer.

Hydroxy-terminated hyperbranched polyesters are presently preferred starting materials for the preparation of water-soluble or water-dispersible fluorine-containing dendritic polymer surfactants in accordance with the invention because of their relatively low cost and commercial availability. Suitable hydroxy-terminated hyperbranched polyesters for use in the manner of this invention include first through fourth generation polymers having molecular weights ranging from about 1,500 to about 8,000, and having from about 16 to about 64 terminal hydroxy groups.

The fluorine-containing dendritic polymer surfactants which are employed in the coating compositions of this invention are provided with at least one pendent fluorocarbon moiety and at least one pendent anionic moiety.

The fluorocarbon moiety is a linear or branched fluoroalkyl group having at least one terminal trifluoromethyl group and containing at least three fully fluorinated carbon atoms. Preferred fluoroalkyl moieties are fully fluorinated alkyls, i.e., perfluoroalkyls.

Fluorocarbon moieties can be introduced into a dendritic polymer by reacting the dendritic polymer with a fluorine-containing compound having a fluoroalkyl moiety and a reactive linking moiety capable of covalently bonding to the reactive terminal groups of the dendritic polymer. For example, a hydroxy-terminated hyperbranched polyester can be reacted with a fluorine-containing acyl halide in the presence of a suitable solvent, such as pyridine, for a suitable period of time (e.g., 16 hours) at room temperature to form a perfluoroalkyl-terminated hyperbranched polyester as follows:

Polyester Dendrimer—[OH]$_n$ $\xrightarrow[\text{pyridine, RT 16 h}]{F_3CC_7F_{14}-SO_2N(Et)CH_2COCl}$

[HO$\frac{}{n-o}$Dendrimer$\frac{}{}$O—COCH$_2$N(Et)SO$_2$—C$_7$F$_{14}$CF$_3$]$_o$ where n is the total number of terminal groups on the dendritic polymer and O is the number of fluoroalkyl-containing terminal moieties.

Preferred anionic moieties include carboxylate groups and thiol groups, with carboxylate terminal moieties being most preferred. Anionic moieties can be covalently bonded to the reactive terminals of the dendritic polymer by reacting a anionic moiety-containing compound or a compound capable of forming an anionic moiety with the reactive terminal groups of the dendritic polymer. For example, terminal carboxyl moieties can be introduced into a hydroxy-terminated dendritic polymer by reacting the terminal hydroxy groups with an anhydride of a dicarboxylic acid. For instance, the above perfluoroalkyl-terminated hyperbranched polyester can be reacted with succinic anhydride at room temperature for a suitable period of time (e.g., 48 hours) in a suitable solvent (e.g., pyridine) to form a carboxyl/perfluoroalkyl-terminated hyperbranched polyester as follows:

[HO$\frac{}{n-o}$Dendrimer$\frac{}{}$O—COCH$_2$N(Et)SO$_2$—C$_7$F$_{14}$CF$_3$]$_o$

[H$\frac{}{n-o-p}$Dendrimer$\frac{}{}$O—COCH$_2$N(Et)SO$_2$—C$_7$F$_{14}$CF$_3$]$_o$[O—COCH$_2$CH$_2$—CO$_2$H]$_p$ The number of anionic terminal moieties and perfluoroalkyl terminal moieties can be varied as desired to provide custom tailored properties for particular applications. In general, higher levels of anionic terminal moieties provide better water-solubility or water-dispersibility.

The crosslinking compounds used in the preparation of coating compositions in accordance with this invention are compounds containing a plurality (at least two) of oxazoline moieties represented by the formula where each R is a hydrogen atom, a hydroxy methyl group or an organic radical, and k is 1 or 2, most preferably 1. Preferred oxazoline crosslinking agents include polymeric compounds containing pendant oxazolines moieties, such as poly(2-isopropenyl-2-oxazoline-co-methyl methacrylate), polyIPO/MMA. For example, suitable polymeric oxazoline crosslinking agents can be prepared by reacting a polyacrylate, such as poly(methyl methacrylate), with ethanolamine, e.g., at 140° C. for 40 hours in an aminolysis reaction, to produce an acrylic polymer having pendant hydroxy groups as follows:

where P is the total number of acrylate units or monomers in the polyacrylate and o is the number of acrylate units which have been reacted. The above amidated polyacrylate is subsequently subjected to conditions which cause the pendant hydroxyethylamide moieties to undergo ring formation to form oxazoline moieties. For example, in the presence of CH$_3$SO$_2$Cl in a suitable solvent, such as DMF, the pendant hydroxyethylamide groups are converted into oxazoline moieties at room temperature in about 2 hours to form an acrylic polymer having pendant oxazoline moieties as follows:

Coating formulations in accordance with the invention are prepared by combining the water-soluble or water-dispersible fluorine-containing dendritic polymer surfactants and oxazoline crosslinking agents in water or in an aqueous solution comprised primarily of water and containing a minor amount of an organic solvent. Organic cosolvents are generally not preferred, although small amounts, i.e., 20 percent by weight or less, may be added to aid curing.

The coating compositions of this invention can be applied by generally any conventional method, such as those used to apply paint to surfaces. Suitable techniques for applying the coatings of this invention include wiping, brushing, spraying, dipping, and spin-coating. Suitable substrates for the coatings of this invention include metal, plastic, glass, masonry, paper and textiles. Any suitable heating method may be used to cure the coatings, such as radiant heating and heated air.

The coating compositions of this invention are extremely stable, i.e., crosslinking does not occur to any appreciable extent during storage of the coating compositions in a sealed container.

After application, the coating compositions of this invention cure very rapidly at relatively low temperatures, e.g., typically over 80% cure in 15 minutes or less at a temperature of 110° C. The coating compositions of the invention also have the advantage of being non-flammable, and have very low or no volatile organic compounds (VOCs).

Curing of the coating compositions of this invention occurs upon application of heat by reaction of the oxazoline moieties of the crosslinking agent with the anionic groups of the water-soluble or water-dispersible fluorine-containing dendritic polymer surfactant. For example:

PREPARATION OF WATER-BORNE NON-STICK COATINGS:
CROSSLINKING REACTION

D = dendritic polymer
$R_f$ = fluorocarbon-containing moiety

Examples of suitable cosolvents include ethylene glycol, propylene glycol, and the like. The concentrations of the formulation can typically range from about 0.01 to about 60 weight percent solids (i.e., the dendritic polymer surfactant and oxazoline crosslinker constitute from about 0.01 to about 60% of the composition by weight) and more preferably from about 1.0 to about 25 weight percent solids (i.e., from 1 to 25 weight percent dendritic polymer surfactant and oxazoline crosslinker). The preferred concentrations will depend on such factors as the desired viscosity, coating thickness and method of application. The amounts of water-dispersible or water-soluble fluorine-containing dendritic polymers and oxazoline crosslinking agents are selected so that the mole ratio of oxazoline moieties to anionic moieties is preferably about 1:1, for example, from about 0.8:1 to about 1.2:1. Lower or higher ratios provide coatings with more hydrophilic surfaces. The pH of the aqueous formulation is preferably kept slightly basic to avoid acid catalyzed hydrolysis of the oxazoline groups in the crosslinking agent. The pH of the formulation is preferably adjusted to a range of from about 7 to about 8. However, the preferred pH will depend on the pH stabilities of other functional groups present in the polyoxazoline and fluorine-containing dendritic polymer surfactant. The preferred cation, $C^+$, include ammonium and low molecular weight protonated amines.

EXAMPLE 1

Preparation of Carboxy/Perfluoroalkyl-Terminated Hyperbranched Polymers

Perstorp polyol and pyridine were combined in a 100 ml round bottom flask under nitrogen. The mixture became homogeneous after stirring at room temperature for 2 hours. To the vigorously stirred mixture was added a solution of $C_8F_{17}SO_2N(Et)CH_2COCl$ in dry acetone (38% w/w) at a rate of 0.5 ml/minute using a syringe pump. The mixture was then stirred overnight at room temperature. Succinic anhydride was added to the solution in a single portion. After 48–72 hours, the reaction mixture was diluted with methanol (150 ml) and purified by ultrafiltration employing a tangential flow device (Amicon) equipped with a MWco=1000 membrane (Amicon YM1). After 8 retentate volumes of permeate were obtained, the retentate was concentrated under reduced pressure using a rotary evaporator. The residue was evacuated under high vacuum at room temperature to afford a viscous liquid. The mole percent of terminal carboxyl groups and terminal perfluoroalkyl groups were determined from the $^1$HNMR spectrum of the product (300 MHz, acetone-$d_6$/TMS). The mole percent of terminal carboxy groups was determined from the ratio of the integrated intensities of the signals at δ 2.6 (br s, COCH$_2$CH$_2$CO) and δ 3.5–3.7 (complex, CH$_2$OH). The mole percent of terminal perfluoroalkl groups was determined from the ratio of integrated intensities of the signals at δ 2.6 (br s, COCH$_2$CH$_2$CO) and δ 4.2–4.4 (complex, CH$_2$O—CO and N—CH$_2$).

Products derived from generation 2, 3, and 4 hyperbranched polyesters were prepared using the quantities of reagents specified in Table 1.

EXAMPLE 2

Preparation of poly(2-isopropenyl-2-oxazoline-co-methyl methacrylate)

A 5 liter 3-neck round bottom flask was equipped with a reflux condenser, mechanical stirrer (teflon blade), and a thermometer attached to a Therm-o-Watch temperature controller. To the flask was added poly(methyl methacrylate) (MW=75,000, 500 g, 5 moles ester) and ethanolamine (2443 g, 40 moles) under nitrogen. The mixture was stirred and heated at 150° C. for 35 hours and then allowed to cool to room temperature. The mixture was diluted with methanol (5 liters) and added dropwise to 3 volumes of mechanically stirred toluene. After completion of the addition, the mixture was allowed to stand undisturbed for 10 minutes. The supernatant liquid was decanted and the residue was washed twice with toluene (2×300 mL). The residue was dissolved in methanol (3 liters) and added dropwise to three times the volume of stirred toluene. The precipitate was collected in a Buchner funnel and washed twice with toluene (2×200 mL). Drying overnight under high vacuum at 50° C. afforded poly(2-hydroxyethylmethacrylamide-co-methyl methacrylate) (550 g, 85%).

To a 1 liter 3 neck round bottom flask equipped with a mechanical stirrer was added poly(2-hydroxyethylmethacrylamide-co-methyl methacrylate) (52 g, 403 mmole OH) and dimethylformamide (DMF, 300 mL) under nitrogen. The stirred mixture was heated at 150° C. until complete dissolution occurred and then allowed to cool to room temperature. The stirred mixture was treated with methanesulfonyl chloride (58 g, 506 mmole) and heated at 100° C. until homogeneous. The mixture was then stirred an additional 2 hours at room temperature. The mixture was diluted with DMF (50 mL) and added during a 10 minute period to a solution of sodium methoxide (101 g, 1.87 mole) in DMF (100 mL) under nitrogen. After stirring for 2 hours at room temperature, most of the solvent was removed by vacuum distillation (1–5 mmHg, 80°–150° C. The resulting residue was dissolved in methanol (3 liters) and ultrafiltered using a tangential ultrafiltration system (Amicon B6) equipped with regenerated cellulose membrane (MWco= 3000, 4.2 ft$^2$). After 8 retentate volumes of permeate were collected, the retentate was filtered through Whatman No.1 paper. The filtrate was concentrated under reduced pressure using a rotary evaporator. The residue was evacuated at high vacuum for 18 hours to afford the desired product (41 g, 91%) as a slightly brown solid. The mole percentage of oxazoline was determined to be 86%, based on the integrated intensities of the oxazoline CH$_2$ (multiplets, δ 3.77 and 4.28, 4H) and ester CH$_3$ (s, δ 3.63, 3H) signals in the $^1$HNMR spectrum (300 MHz, CD$_3$OD/TMS) of the product.

EXAMPLE 3

Formulation of Coatings

The carboxy/perfluoroalkyl-terminated hyperbranched polyester was dissolved in isopropanol (30% w/w). The pH of the solution was adjusted to 7–8 with ammonium hydroxide (1N). To the solution was added an aqueous solution of polyIPO/MMA (10% w/w, 7.85 mmoles oxazoline/g polymer) in an amount required to achieve a 1:1 mole ratio of oxazoline/CO$_2$H. Ethylene glycol was added to the mixture in an amount equal to the combined weight of hyperbranched polymer and polyIPO/MMA. The mixture was then diluted with deionized water to achieve a final concentration of 10–12% w/w solids. The mixture was stirred until homogeneous and then filtered (0.5 μm).

EXAMPLE 4

Application of Coatings to Substrates

Each coating formulation was applied to a single infrared AgCl crystal window (2.5×2.5×0.1 cm) and a glass microscope slide (25×75×1 mm) with a Paul-Gardner wire-wound film applicator (AP-FD02.5, wire #2.5) for determination of the extent of crosslinking and contact angle measurements, respectively.

EXAMPLE 5

Thermal Cure of Coatings

Freshly coated substrates were cured in an oven at 110° C. The infrared windows were removed from the oven following cumulative cure times of 0.25 h, 0.5 h, 0.75 h, 1 h, 4 h, 10 h, 24 h, and 46 h (or 48 h). The windows were allowed to cool to room temperature prior to spectrometric analysis. The coated glass slides were removed from the oven after 1 hour of cure and allowed to cool to room temperature prior to contact angle measurements.

EXAMPLE 6

Determination of the Extent of Crosslinking in Coatings

The extent of crosslinking in the coatings was determined by monitoring the amide N—H, amide C=O, and oxazoline C=N stretching absorptions using FTIR spectrometry. Spectra were recorded on a Nicolet FTIR spectrometer and analyzed using OMNIC FTIR software. FTIR spectra of the cured films feature an amide N—H stretching absorption in the region from 1500 to 1550 cm$^{-1}$ and overlapping amide C=O and oxazoline C=N stretching absorptions in the region from 1580 to 1680 cm$^{-1}$. The extent of crosslinking in cured coatings was calculated using equation 1:

$$\text{Extent of crosslinking, \%} = \frac{A_{amide\ N-H}\ \mathcal{A}_{amide\ N-H}}{A_{amide\ C=O}\ \mathcal{A}_{amide\ C=O} + A_{oxazoline}\ \mathcal{A}_{oxazoline}} \times 100 \quad (1)$$

here $A_{amide\ N-H}$ is the integrated amide N—H absorbance, $A_{amide\ C=O}$ is the integrated amide C=O absorbance, $A_{oxazoline}$ is the integrated oxazoline C=N absorbance, $\mathcal{A}_{amide\ N-H}$ is the absorptivity of the amide N—H stretching absorption.

$\mathcal{A}_{amide\ C=O}$ is the absorptivity of the amide C=O stretching absorption, and $\mathcal{A}_{oxazoline}$ is the absorptivity of the oxazoline C=N stretching absorption. Absorptivities for the amide N—H, amide C=O, and oxazoline C=N stretching absorptions were derived from the slopes of absorbance versus concentration plots for the model compounds poly[N-(2-hydroxyethyl)methacrylamide-co-methyl methacrylate], N-(2-hydroxyethyl)-2,2- dimethylpropanamide, and poly(2-isopropenyl-2-oxazoline-co-methyl methacrylate), respectively. The absorptivity of the amide N—H stretching absorption is $8 \times 10^6$ cm/mole in the range from 1500–1550 $cm^{-1}$. The absorptivities of the amide C=O and oxazoline C=N stretching absorptions are $1.81 \times 10^7$ cm/mole and $1.58 \times 10^7$ cm/mole in the range from 1580–1680 $cm^{-1}$.

The results of cure studies employing hyperbranched polymer coatings are shown in Table 2.

EXAMPLE 7

Contact Angle Measurements

The contact angles of deionized water and hexadecane (Aldrich, 90+%) on cured coatings were determined using a Rame-Hart goniometer (Model A-100). The liquid drops were applied using a microliter syringe (Gilmont). The advancing contact angle of water was measured on a 50 μl water droplet and the receding contact angle was measured after 30 μl of water was withdrawn from the droplet. The advancing contact angle of hexadecane was measured on a 5 μl droplet and the receding contact angle was measured following the withdrawal of 3 μl of hexadecane from the droplet.

The results of contact angle measurements performed on hyperbranched polymer coatings are provided in Table 3.

TABLE 1

Preparation of Carboxy/Perfluoroalkyl-Terminated Hyperbranched Polymers

| | Hyperbranched Polymer | | | $C_8H_{17}SO_2N(Et)CH_2COCl$ | | Succinic Anhydride | | Pyridine | Product Composition | |
|---|---|---|---|---|---|---|---|---|---|---|
| Preparation | Generation | grams | mmoles OH | grams | mmoles | grams | mmoles | ml | mole % $R_f$ | mole % $CO_2H$ |
| 1 | 2 | 1.90 | 17.1 | 0.85 | 1.40 | 3.10 | 30.0 | 14.0 | 12 | 56 |
| 2 | 2 | 1.30 | 11.7 | 2.17 | 3.60 | 1.50 | 15.0 | 10.0 | 22 | 36 |
| 3 | 3 | 2.82 | 24.7 | 1.21 | 2.00 | 2.50 | 25.0 | 25.0 | 6.4 | 46 |
| 4 | 3 | 3.16 | 27.7 | 8.80 | 14.6 | 2.80 | 28.0 | 28.0 | 40 | 31 |
| 5 | 4 | 3.00 | 26.0 | 1.28 | 2.12 | 3.00 | 30.0 | 25.0 | 5.1 | 63 |
| 6 | 4 | 3.00 | 26.0 | 4.83 | 8.00 | 3.00 | 30.0 | 25.0 | 25.0 | 48 |

$R_f = —C_8F_{17}$

TABLE 2

Curing of Hyperbranched Polymer Coatings‡

| Hyperbranched Polymer Surfactant | | | | | |
|---|---|---|---|---|---|
| Coating | Generation | mole % $R_f$ | mole % $CO_2H$ | Cure Time hours | Crosslinking % |
| 1 | 2 | 12 | 56 | 0.25 | 83 |
| | | | | 0.5 | 88 |
| | | | | 0.75 | 89 |
| | | | | 1 | 90 |
| | | | | 2 | 93 |
| | | | | 4 | 94 |
| | | | | 10 | 96 |
| | | | | 24 | 97 |
| | | | | 46 | 99 |
| 2 | 2 | 22 | 36 | 0.25 | 81 |
| | | | | 0.5 | 89 |
| | | | | 0.75 | 91 |
| | | | | 1 | 93 |
| | | | | 2 | 97 |
| | | | | 4 | 100 |
| | | | | 10 | 100 |
| | | | | 24 | 95 |
| | | | | 46 | 97 |
| 3 | 3 | 6.4 | 46 | 0.25 | 82 |
| | | | | 0.5 | 88 |
| | | | | 0.75 | 88 |
| | | | | 1 | 89 |
| | | | | 2 | 91 |
| | | | | 4 | 94 |
| | | | | 10 | 99 |
| | | | | 24 | 100 |
| | | | | 48 | 99 |
| 4 | 3 | 40 | 31 | 0.25 | 86 |
| | | | | 0.5 | 91 |
| | | | | 0.75 | 94 |
| | | | | 1 | 96 |
| | | | | 2 | 97 |
| | | | | 4 | 100 |
| | | | | 10 | 99 |
| | | | | 24 | 98 |
| | | | | 46 | 97 |
| 5 | 4 | 5.1 | 63 | 0.25 | 76 |
| | | | | 0.5 | 79 |
| | | | | 0.75 | 81 |
| | | | | 1 | 82 |
| | | | | 2 | 86 |
| | | | | 4 | 87 |
| | | | | 10 | 91 |
| | | | | 24 | 95 |
| | | | | 48 | 97 |
| 6 | 4 | 25 | 48 | 0.25 | 82.2 |
| | | | | 0.5 | 87 |
| | | | | 0.75 | 88 |
| | | | | 1 | 91 |
| | | | | 2 | 93 |
| | | | | 4 | 96 |
| | | | | 10 | 97 |
| | | | | 24 | 99.6 |
| | | | | 48 | 100 |

‡ Coatings cured at 110° C.
$R_f = —C_8F_{17}$

TABLE 3

Physical Properties of Hyperbranched Polymer Coatings‡

| | Hyperbranched Polymer Surfactant | | | Contact Angle, degrees | | | |
|---|---|---|---|---|---|---|---|
| Coating | Generation | mole % $R_f$ | mole % $CO_2H$ | $\Theta_{a\,water}$ | $\Theta_{r\,water}$ | $\Theta_{a\,hexadecane}$ | $\Theta_{r\,hexadecane}$ |
| 1 | 2 | 12 | 56 | 112 | 85 | 61 | 61 |
| 2 | 2 | 22 | 36 | 111 | 84 | 66 | 65 |
| 3 | 3 | 6.4 | 46 | 112 | 81 | 66 | 66 |
| 4 | 3 | 40 | 31 | 115 | 89 | 68 | 67 |
| 5 | 4 | 5.1 | 63 | 115 | 88 | 68 | 67 |
| 6 | 4 | 25 | 48 | 106 | 79 | 68 | 65 |

‡Coatings cured at 110° C. for 1 hour
$R_f = -C_8F_{17}$

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A water-soluble or water-dispersible fluorine-containing dendritic polymer surfactant having at least one pendant fluorocarbon moiety and at least one pendant anionic moiety.

2. The dendritic polymer surfactant of claim 1 represented by the formula where D represents a dendritic polymer, $R_F$ represents a fluorocarbon-containing moiety, $A^-$ represents an anionic-containing moiety, $C^+$ represents a cation, T represents a terminal group of the dendritic polymer which has not been functionalized with a fluorocarbon or anionic moiety, n and m are each at least one, and the sum of n+m+q is the total number of terminal groups on the dendritic polymer.

3. The dendritic polymer surfactant of claim 2, wherein the dendritic polymer is a dendron or dendrimer.

4. The dendritic polymer surfactant of claim 2, wherein the dendritic polymer is a hyperbranched polyester.

5. The dendritic polymer surfactant of claim 2, wherein the fluorocarbon-containing moiety includes a linear or branched fluoroalkyl group having at least one terminal trifluoromethyl group and containing at least three fully fluorinated carbon atoms.

6. The dendritic polymer surfactant of claim 2, wherein the fluorocarbon-containing moiety includes a perfluoroalkyl group.

7. The dendritic polymer surfactant of claim 2, wherein the fluorocarbon-containing moiety is represented by the formula—$COCH_2N(C_2H_5)SO_2(C_7F_{14}CF_3)$.

8. The dendritic polymer surfactant of claim 2, wherein the anionic-containing moiety includes a carboxylate group.

9. The dendritic polymer surfactant of claim 2, wherein the T groups are hydroxy groups.

10. The dendritic polymer surfactant of claim 2, wherein the cation is ammonium.

11. The dendritic polymer surfactant of claim 2, wherein the cation is a low molecular weight protonated amine.

12. A non-stick coating composition comprising:

a water-soluble or water-dispersible fluorine-containing dendritic polymer surfactant having at least one pendant fluorocarbon moiety and at least one pendant anionic moiety;

a crosslinking compound containing a plurality of oxazoline or oxazine moieties represented by the formula where each R is a hydrogen atom, a hydroxy methyl group or an organic radical, and k is one or two; and an aqueous solvent comprising primarily water and optionally containing a minor amount of an organic solvent.

13. The coating composition of claim 12, wherein the dendritic polymer surfactant is represented by the formula where D represents a dendritic polymer, $R_F$ represents a fluorocarbon containing moiety, $A^-$ represents an anionic-containing moiety, $C^+$ represents a cation, T represents a terminal group of the dendritic polymer which has not been functionalized with a fluorocarbon or anionic moiety, n and m are each at least one, and the sum of n+m+q is the total number of terminal groups on the dendritic polymer.

14. The coating composition of claim 13, wherein the T groups are hydroxy groups.

15. The coating composition of claim 13, wherein the dendritic polymer is a hyperbranched polyester.

16. The coating composition of claim 13, wherein the fluorocarbon moiety is a linear or branched fluoroalkyl group having at least one terminal trifluoromethyl group and containing at least three fully fluorinated carbon atoms.

17. The coating composition of claim 16, wherein the anionic-containing moiety includes a carboxylate group.

18. The coating composition of claim 13, wherein the oxazoline crosslinking agents include polymeric compounds containing pendant oxazoline moieties.

19. The coating composition of claim 18, wherein the oxazoline crosslinking agent is an acrylate polymer having pendant oxazoline moieties.

20. The coating composition of claim 13, wherein the dendritic polymer surfactant and oxazoline crosslinking agent comprise from about 0.01 to about 60% of the composition by weight.

21. The coating composition of claim 20, wherein the amounts of fluorine-containing dendritic polymers and oxazoline crosslinking agents are selected so that the mole ratio of oxazoline moieties to anionic moieties is from about 0.8:1 to about 1.2:1.

22. The coating composition of claim 13, wherein the pH is from about 7 to about 8.

23. The coating composition of claim 13, wherein the fluorocarbon-containing moiety includes a perfluoroalkyl group.

24. The coating composition of claim 13, wherein the fluorocarbon-containing moiety is represented by the formula—$COCH_2N(C_2H_5)SO_2(C_7F_{14}CF_3)$.

25. The coating composition of claim 13, wherein the anionic-containing moiety includes a carboxylate group.

26. The coating composition of claim 13, wherein the cation is ammonium.

27. The coating composition of claim 13, wherein the cation is a low molecular weight protonated amine.

28. A highly crosslinked protective coating comprising a reaction product of a dendritic polymer surfactant having at least one pendant fluorocarbon moiety and at least one pendant anionic moiety and an oxazoline crosslinking agent.

29. The coating of claim 28, wherein the dendritic polymer surfactant is represented by the formula where D represents a dendritic polymer, $R_F$ represents a fluorocarbon containing moiety, $A^-$ represents an anionic-containing moiety, $C^+$ represents a cation, T represents a terminal group of the dendritic polymer which has not been functionalized with a fluorocarbon or anionic moiety, n and m are each at least one, and the sum of n+m+q is the total number of terminal groups on the dendritic polymer.

30. The coating of claim 29, wherein the T groups are hydroxy groups.

31. The coating of claim 29, wherein the dendritic polymer is a hyperbranched polyester.

32. The coating of claim 29, wherein the fluorocarbon moiety is a linear or branched fluoroalkyl group having at least one terminal trifuoromethyl group and containing at least three fully fluorinated carbon atoms.

33. The coating of claim 31, wherein the anionic-containing moiety includes a carboxylate group.

34. The coating of claim 29, wherein the oxazoline crosslinking agents include polymeric compounds containing pendant oxazoline moieties.

35. The coating of claim 34, wherein the oxazoline crosslinking agent is an acrylate polymer having pendant oxazoline moieties.

36. The coating of claim 35, wherein the amounts of fluorine-containing dendritic polymers and oxazoline crosslinking agents are selected so that the mole ratio of oxazoline moieties to anionic moieties is from about 0.8:1 to about 1.2:1.

37. The coating of claim 29, wherein the fluorocarbon-containing moiety includes a perfluoroalkyl group.

38. The coating of claim 29, wherein the fluorocarbon-containing moiety is represented by the formula—$COCH_2N(C_2H_5)SO_2(C_7F_{14}CF_3)$.

39. The coating of claim 29, wherein the anionic-containing moiety includes a carboxylate group.

40. The coating of claim 29, wherein the cation is ammonium.

41. The coating of claim 29, wherein the cation is a low molecular weight protonated amine.

* * * * *

UNITED STATES PATENT AND TRADEMARK OFFICE
CERTIFICATE OF CORRECTION

PATENT NO. : 5,731,095
DATED : March 24, 1998
INVENTOR(S) : Larry A. Milco and Donald A. Tomalia It is certified that error appears in the above-identified patent and that said Letters Patent is hereby corrected as shown below:

Abstract, line 15;

Delete "at least" (1st occurrence).

Column 2, line 56;

"macromolecular" should be --macromolecule--.

Column 3, line 4;

"cove" should be --core--.

*Column 5, line 36;

"a" (1st occurrence) should be --an--.

Column 5, After line 55,(2nd equation);

"$[H]_{nop}$ Dendrimer (etc.)" should be

--$[HO]_{nop}$ Dendrimer (etc.)--.

Column 6, line 13

"oxazolines" should be --oxazoline--.

UNITED STATES PATENT AND TRADEMARK OFFICE
CERTIFICATE OF CORRECTION

PATENT NO. : 5,731,095
DATED : March 24, 1998
INVENTOR(S) : Larry A. Milco and Donald A. Tomalia It is certified that error appears in the above-identified patent and that said Letters Patent is hereby corrected as shown below:

Columns 11 & 12, Table 2, line 2 of the 3 Sections, Subheadings;

"Hyperbranced" should be --Hyperbranched--.

Column 16, claim 32, line 7;

"trifuoromethyl" should be --trifluoromethyl--.

Signed and Sealed this

First Day of September, 1998

*Attest:*

BRUCE LEHMAN

*Attesting Officer*  *Commissioner of Patents and Trademarks*